(12) United States Patent
Tanabe et al.

(10) Patent No.: US 10,065,357 B2
(45) Date of Patent: Sep. 4, 2018

(54) PREFORM HANDLING DEVICE, AND BLOW FORMING DEVICE

(71) Applicant: NISSEI ASB MACHINE CO., LTD., Nagano (JP)

(72) Inventors: Yoshiaki Tanabe, Ueda (JP); Atsushi Sakurai, Tomi (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 203 days.

(21) Appl. No.: 15/097,727

(22) Filed: Apr. 13, 2016

(65) Prior Publication Data

US 2016/0221246 A1    Aug. 4, 2016

Related U.S. Application Data

(63) Continuation of application No. PCT/JP2014/077132, filed on Oct. 10, 2014.

(30) Foreign Application Priority Data

Oct. 15, 2013   (JP) .................................. 2013-214558

(51) Int. Cl.
*B29C 49/42* (2006.01)
*B29C 49/64* (2006.01)
(Continued)

(52) U.S. Cl.
CPC ...... *B29C 49/4205* (2013.01); *B29C 49/6409* (2013.01); *B29B 2911/14426* (2013.01);
(Continued)

(58) Field of Classification Search
CPC ....... B29C 49/4205; B29B 2911/14426; B29B 2911/14473; B29L 2031/716; B65G 47/846
See application file for complete search history.

(56) References Cited

U.S. PATENT DOCUMENTS 6,276,514 B1 * 8/2001 Cochin ................ B65G 47/846
198/459.2
2011/0127141 A1    6/2011 Zoppas et al.
(Continued)

FOREIGN PATENT DOCUMENTS

DE    102012217457 A1 *  5/2014  .......... B65G 47/846
JP    2011528629 A    11/2011
(Continued)

*Primary Examiner* — Robert B Davis
(74) *Attorney, Agent, or Firm* — David L. Hoffman; Hoffman Patent Group

(57) ABSTRACT

A preform has a flange that protrudes outward at a neck, and is supplied in an inverted state. A preform handling device includes a star wheel that is configured so that the preform is supplied to each of a plurality of depressions that are formed in an outer circumferential part of a wheel, and pushes the preform to rotationally transfer the preform from an upstream region to a downstream region, an end face guide member that is provided in the upstream region so as to be situated under the preform and that support and guide an open end face of the preform, and a pair of flange guide members that are provided in the downstream region and that support and guide a lower side of the flange of the preform.

5 Claims, 10 Drawing Sheets

(51) Int. Cl.
*B29L 31/00* (2006.01)
*B29K 105/00* (2006.01)

(52) U.S. Cl.
CPC ............... *B29B 2911/14446* (2013.01); *B29B 2911/14473* (2013.01); *B29K 2105/258* (2013.01); *B29L 2031/712* (2013.01); *B29L 2031/716* (2013.01)

(56) References Cited

U.S. PATENT DOCUMENTS

| | | |
|---|---|---|
| 2013/0175738 A1 | 7/2013 | Tsuchiya et al. |
| 2013/0241118 A1 | 9/2013 | Sato et al. |

FOREIGN PATENT DOCUMENTS

| | | |
|---|---|---|
| JP | 2012071453 | 4/2012 |
| JP | 2012229114 | 11/2012 |
| WO | WO2003008176 A1 | 1/2003 |
| WO | WO2010007159 A1 | 1/2010 |
| WO | WO2012029528 A1 | 3/2012 |
| WO | WO2012046620 A1 | 4/2012 |

\* cited by examiner

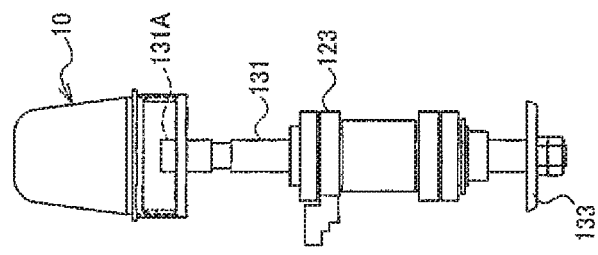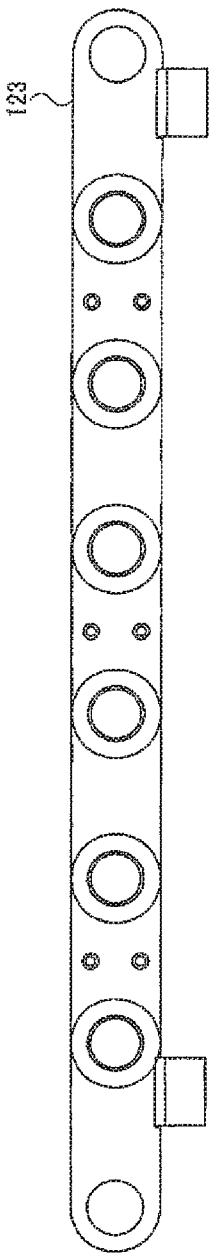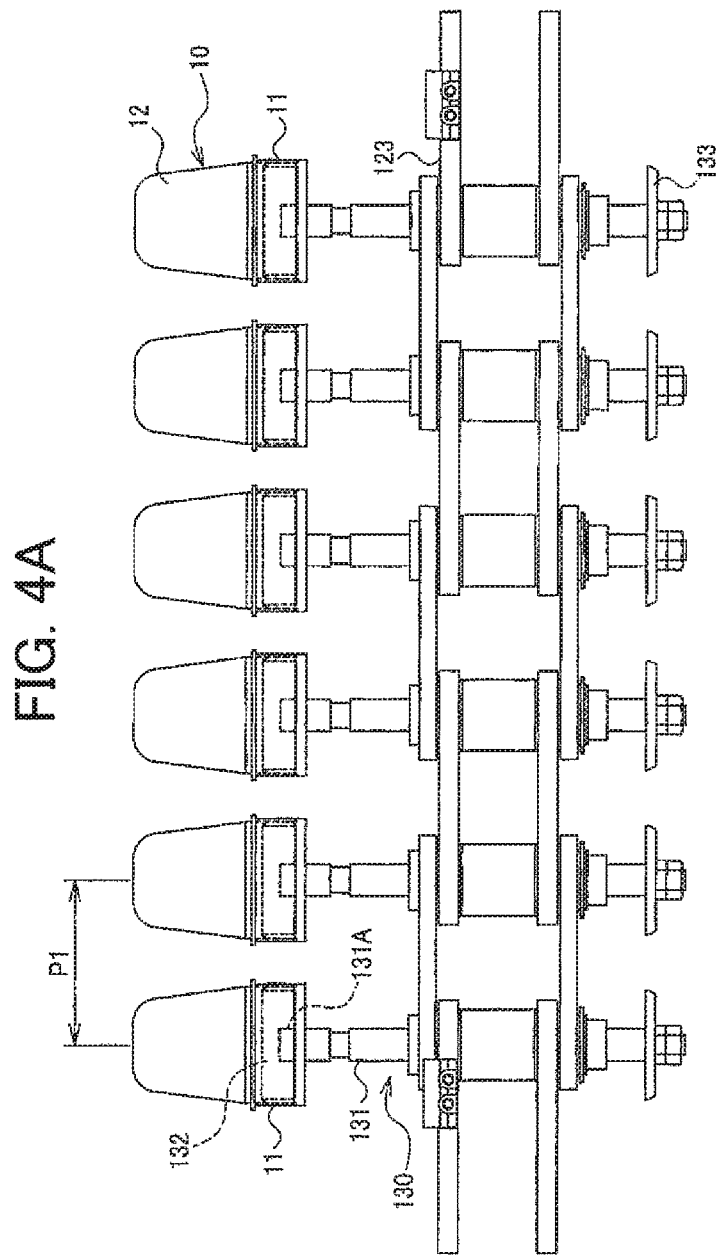

PREFORM HANDLING DEVICE, AND BLOW FORMING DEVICE

CROSS REFERENCE TO RELATED APPLICATION

This application is a continuation of International Patent Application No. PCT/JP2014/077132, having an international filing date of Oct. 10, 2014, which designated the United States and which claims priority from Japanese Patent Application No. 2013-214558 filed on Oct. 15, 2013, the entirety of both of which are incorporated herein by reference.

TECHNICAL FIELD

The present invention relates to a preform handling device, a blow molding device, and the like.

BACKGROUND ART

A narrow-mouth (narrow-neck) container that is widely used as a beverage container (e.g., polyethylene terephthalate (PET) bottle), and a wide-mouth (wide-neck) container in which the ratio of the outer diameter (e.g., 43 mm or more) of the neck to the outer diameter of the body is large, are known as containers made of a synthetic resin. The wide-mouth container is widely used as a solid (e.g., jam) container in addition to a liquid container since it is easy to remove the contents from the wide-mouth container. The narrow-mouth container and the wide-mouth container are produced by blow-molding a narrow-mouth preform or a wide-mouth preform that is designed to produce the desired (final) shape.

Such a preform is consecutively supplied to a blow molding device, a neck crystallization device, or the like along a tilted guideway (chute) by utilizing the weight of the preform. The narrow-mouth preform having a long body is supplied through the chute in an upright state in which the open end face faces upward, and rotationally transferred to a blow molding device using a star wheel (see JP-T-2011-528629 and JP-A-2012-229114). The wide-mouth preform having a short body is supplied through the chute in an inverted state in which the open end face faces downward, and rotationally transferred to a blow molding device or a neck crystallization device using a star wheel (see WO2003-008176, WO2012-029528 and WO2012-046620).

SUMMARY OF INVENTION

Technical Problem

A flange is provided to such a preform in order to handle the preform. The thickness and the protrusion amount of the flange (i.e., support ring) provided to the narrow-mouth container preform are specified by standards. Since the production (distribution) volume of narrow-mouth containers is large, the dimensions of the thread and the support ring are also specified by standards from the viewpoint of convenience. Only a small number of standards are provided, and the protrusion amount and the thickness of the support ring are specified to be large (i.e., handling is easy). On the other hand, a flange that is provided to the wide-mouth container preform is not specified by standards, and it is desirable that the flange provided to the wide-mouth container preform have a small protrusion amount and a small thickness in conformity with the shape of a wide-mouth food container that is made of glass and is widely used at present. Since the production volume of this type of container is small, unified thread standards and flange standards are not provided. However, a flange used for handling is indispensable when producing a wide-mouth container made of a synthetic resin. When providing a flange for handling in conformity with the shape of the neck of an existing wide-mouth container, it is necessary to form the flange to have a small thickness and a height almost equal to the thread diameter. A chute that supplies a preform by utilizing the weight of the preform guides the preform while supporting the lower side of the flange of the preform.

In particular, when the wide-mouth container preforms are consecutively supplied in line by means of the chute, the flanges of the wide-mouth container preforms that adjoin overlap each other (i.e., are situated one on top of the other). In this case, the front preform of which the flange sits on the flange of the next wide-mouth preform tilts with respect to the guide face of the chute.

The preforms that are consecutively supplied in line by means of the chute are received by each of a plurality of depressions that are formed in the outer circumferential part of a star wheel that is rotated (i.e., separated from each other), and transferred. The depressions of the star wheel are provided with a protruding flange that enters the support target part (recess) of the preform (e.g., a groove formed between the flange and the thread) to restrict the upward-downward movement of the preform. If the preform is tilted, the star wheel does not enter the recess of the preform.

The protruding flange of the star wheel does not enter the support target part of the preform that is tilted with respect to the guide face of the chute, and supply failure occurs. In this case, it is necessary to stop the operation of the device, whereby a decrease in throughput occurs. If the size of the depressions of the star wheel is increased, the gap between the support target surface of the preform and the protruding flange increases, and it is difficult to implement a stable preform supply operation (e.g., the flange falls from the groove when the protrusion amount of the flange is small). In particular, it is difficult to stably supply a preform of which the support target part is narrow and for which the protrusion amount of the flange is small (e.g., wide-mouth preform).

An object of the invention is to provide a preform handling device and a blow molding device that can rotationally transfer (push) a preform while reliably supporting the preform from the lower side even when the preform is supplied in a state in which the flange is tilted with respect to the guide face of the chute.

Solution to Problems (1) According to one aspect of the invention, there is provided a preform handling device to which a preform is consecutively supplied in line along a chute, the preform having a flange that protrudes outward at a position away from an open end face of a neck, and being supplied in an inverted state in which the open end face faces downward, the preform handling device comprising:

a star wheel that is configured so that the preform is supplied to each of a plurality of depressions that are formed in an outer circumferential part of a wheel that is rotated, and pushes part of the preform that is situated above the flange to rotationally transfer the preform from an upstream region to a downstream region;

an end face guide member that is provided in the upstream region so as to be situated under the preform that is transferred along a transfer path, the end face guide member supporting and guiding the open end face of the preform that is pushed by the star wheel; and a pair of flange guide members that are provided in the downstream region on either side of the transfer path along which the preform is transferred, the pair of flange guide members supporting and guiding a lower side of the flange of the preform that is pushed by the star wheel.

According to one aspect of the invention, the depressions of the star wheel are not provided with a protruding flange and a groove. Specifically, the star wheel does not have a function of supporting the preform, and merely applies a rotational drive force to the preform. Instead of providing the star wheel with a groove, the end face guide member that supports and guides the open end face of the preform in the inverted state is provided in the upstream region in which the preform is rotationally transferred by the star wheel. Therefore, even if the preform is supplied in a tilted state, the preform can be rotationally transferred while supporting the open end face (lower end) of the preform using the end face guide member, and pushing the preform using the depression of the star wheel. In the upstream region, the position of the preform that has been supplied in a tilted state is adjusted by the end face guide member so that the flange extends horizontally due to the weight of the preform. The pair of flange guide members that support and guide the lower side of the flange of the preform are provided in the downstream region on either side of the transfer path along which the preform is transferred. The preform can be transferred in the downstream region without closing the opening of the neck of the preform. Therefore, the preform can be transferred from the star wheel to the transfer member by fitting part of the transfer member into the neck of the preform.

(2) In the preform handling device, wherein a downstream-side end of the end face guide member and an upstream-side end of the pair of flange guide members may overlap each other in a top plan view.

Since the end face guide member and the pair of flange guide members differ in position in the height direction, it is possible to allow the downstream-side end of the end face guide member and the upstream-side end of the pair of flange guide members to overlap each other in a plan view. This makes it possible to smoothly transfer the preform from the end face guide member to the pair of flange guide members.

(3) In the Preform Handling Device, wherein the star wheel may pushes the preform at a position directly above the flange, and the star wheel and one of the pair of flange guide members may be situated in the downstream region on either side of the flange through a gap.

According to this configuration, the star wheel and one of the pair of flange guide members function in the same manner as a groove of a known star wheel in the downstream region at a position within the transfer path.

(4) The preform handling device may further comprise:

a body-restricting member that is provided on an outer side of the transfer path along which the preform is transferred, and restricts movement of a body of the preform, wherein the body-restricting member and the other of the pair of flange guide members may be situated in the downstream region on either side of the flange through a gap.

According to this configuration, the body-restricting member and the other of the pair of flange guide members function in the same manner as a groove of a known star wheel in the downstream region at a position outside the transfer path.

(5) The preform handling device may further comprise:

a plurality of transfer members that are secured on a chain that is driven by a sprocket; and a push-up mechanism that pushes one of the plurality of transfer members upward in the downstream region to fit the one of the plurality of transfer members into the neck of the preform.

Even if part of the transfer member is pushed upward by the push-up mechanism in the downstream region, the part of the transfer member that has been pushed upward does not interfere with the pair of flange guide members. Therefore, the preform is held by the transfer member in a state in which part of the transfer member is inserted into the neck of the preform.

(6) According to another aspect of the invention, there is provided a blow molding device comprising:

the preform handling device may further comprise;

a heating section that heats the preform that is transferred by each of the plurality of transfer members; and a blow molding section that blow-molds the heated preform to produce a container.

According to this aspect of the invention, it is possible to rotationally transfer (push) the preform while reliably supporting the preform from the lower side (i.e., supply failure does not occur) even when the preform is supplied in a state in which the flange is tilted with respect to the guide face of the chute. Therefore, it is possible to continuously operate the blow molding device.

(7) In the blow molding device, the blow molding section may include a primary blow molding section that subjects the preform to primary blow molding inside a primary blow mold that includes a pair of primary blow cavity split molds to form a primary blow-molded article, and heats the primary blow-molded article, and a secondary blow molding section that subjects the primary blow-molded article to secondary blow molding inside a secondary blow mold that includes a pair of secondary blow cavity split molds to form a secondary blow-molded article.

The final molded article obtained by subjecting the heated primary blow-molded article to secondary blow molding exhibits heat resistance.

(8) The blow molding device may further include:

a clamping mechanism that includes a first clamping plate and a second clamping plate, and is shared by the primary blow molding section and the secondary blow molding section;

a first blow base plate and a second blow base plate that are respectively secured on the first clamping plate and the second clamping plate;

a first primary heater plate and a second primary heater plate that are provided along a plane that is opposite to a parting plane of the pair of primary blow cavity split molds, and heat the pair of primary blow cavity split molds;

a first secondary heater plate and a second secondary heater plate that are provided along a plane that is opposite to a parting plane of the pair of secondary blow cavity split molds, and heat the pair of secondary blow cavity split molds;

a first heat insulation plate that is provided between the first primary heater plate and the first blow base plate, and between the first secondary heater plate and the first blow base plate; and a second heat insulation plate that is provided between the second primary heater plate and the second blow base plate, and between the second secondary heater plate and the second blow base plate.

According to this configuration, even if the heating temperature of the primary blow mold using the first primary heater plate and the second primary heater plate differs from the heating temperature of the secondary blow mold using the first secondary heater plate and the second secondary heater plate, it is possible to implement insulation using the first heat insulation plate and the second heat insulation plate.

(9) The blow molding device may further include a connector that is provided in a space between the primary blow mold and the secondary blow mold, and is connected to the first primary heater plate, the second primary heater plate, the first secondary heater plate, and the second secondary heater plate.

The space between the primary blow mold and the secondary blow mold can be used as an insulation space and a space for providing the connector.

(10) In the blow molding device, the first blow base plate and the second blow base plate may respectively provided with positioning pins that protrude toward the first clamping plate and the second clamping plate at a center position in a longitudinal direction.

Since the first blow base plate and the second blow base plate are maintained at about room temperature due to the first heat insulation plate and the second heat insulation plate, and thermal expansion becomes a minimum at the center position in the longitudinal direction, the positioning pins that are provided at the center position in the longitudinal direction have high positional accuracy. Therefore, it is possible to secure the first blow base plate and the second blow base plate on the first clamping plate and the second clamping plate with high positional accuracy by utilizing the positioning pins.

BRIEF DESCRIPTION OF DRAWINGS

FIGS. 4A, 4B, and 4C are respectively a front view, a side view, and a plan view illustrating a transfer member that is attached to a chain.

DESCRIPTION OF EMBODIMENTS

Exemplary embodiments of the invention are described in detail below with reference to a comparative example. Note that the following exemplary embodiments do not in any way limit the scope of the invention defined by the claims laid out herein. Note also that all of the elements described below in connection with the exemplary embodiments should not necessarily be taken as essential elements of the invention.

1. Preform Handling Device

Figure 1:
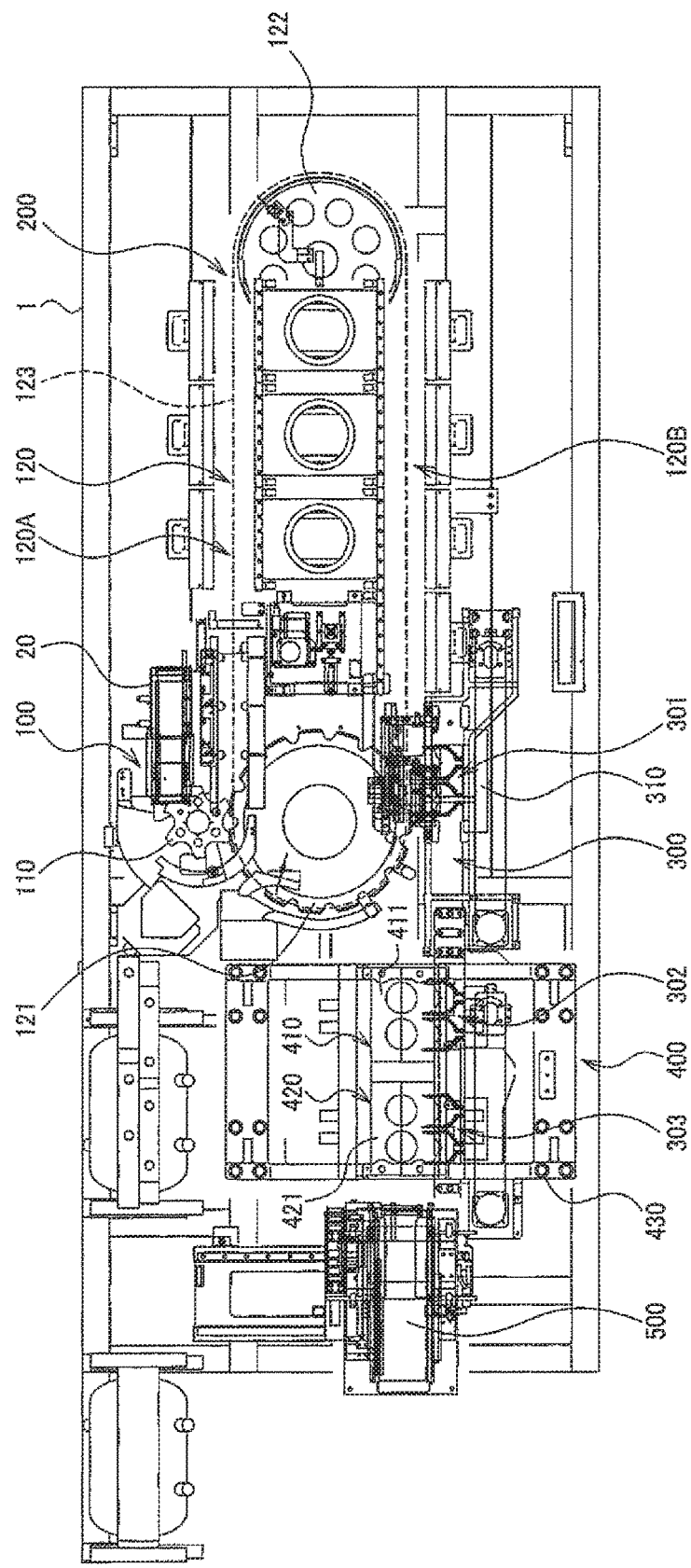
FIG. 1 is a schematic plan view illustrating a blow molding device that includes a preform handling device.

A preform handling device 100 according to one embodiment of the invention is configured to function as a preform-receiving section that is included in a cold-parison blow molding device 1 illustrated in FIG. 1, for example. The blow molding device 1 receives a wide-mouth preform 10 that is supplied from the outside, heats the received wide-mouth preform 10, and blow-molds the heated wide-mouth preform 10 to produce a wide-mouth container.

Figure 2:
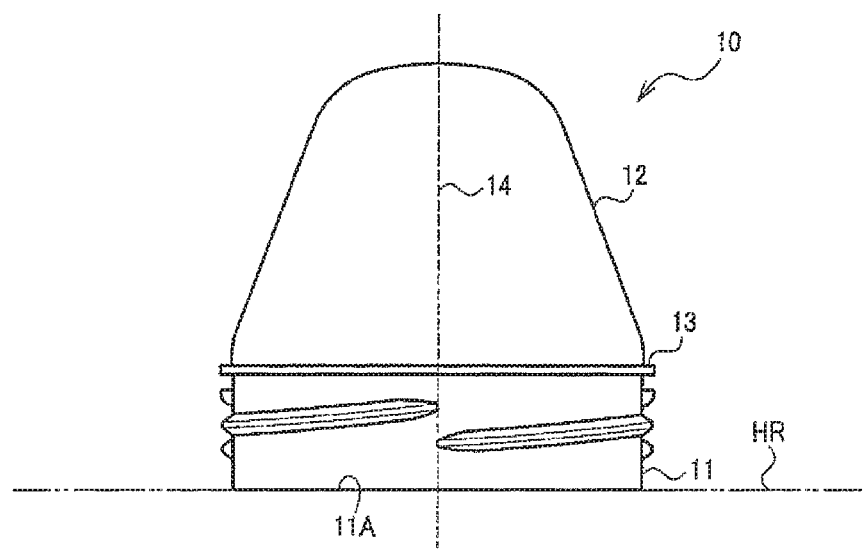
FIG. 2 is a schematic view illustrating an inverted state of a wide-mouth preform.

As illustrated in FIG. 2, the wide-mouth preform 10 includes a neck 11 and a body 12, the neck 11 being relatively larger than the body 12. Therefore, the wide-mouth preform 10 can stand upright on a horizontal plane HR in an inverted state. A thread is formed on the outer circumferential surface of the neck 11, and a flange 13 that protrudes outward is formed at a position away from an open end face 11A of the neck 11 (e.g., at the boundary between the neck 11 and the body 12). The flange 13 is formed to protrude from the neck 11 or the body 12 by about 1 mm so that the outer dimension of the flange 13 is approximately equal to the outer diameter of the thread. A center axis 14 of the preform 10 in the inverted state is orthogonal to the horizontal plane HR.

The wide-mouth preform 10 (that has been produced by injection molding) is supplied to the blow molding device 1 through a chute 20 (external equipment) that is provided to the blow molding device 1. The chute 20 supports the flange 13 of the wide-mouth preform 10 that is in the inverted state in which the open end face 11A faces downward, and allows the wide-mouth preform 10 to fall along a tilted guideway due to its weight (see JP-A-2012-71453, for example).

Figure 3:
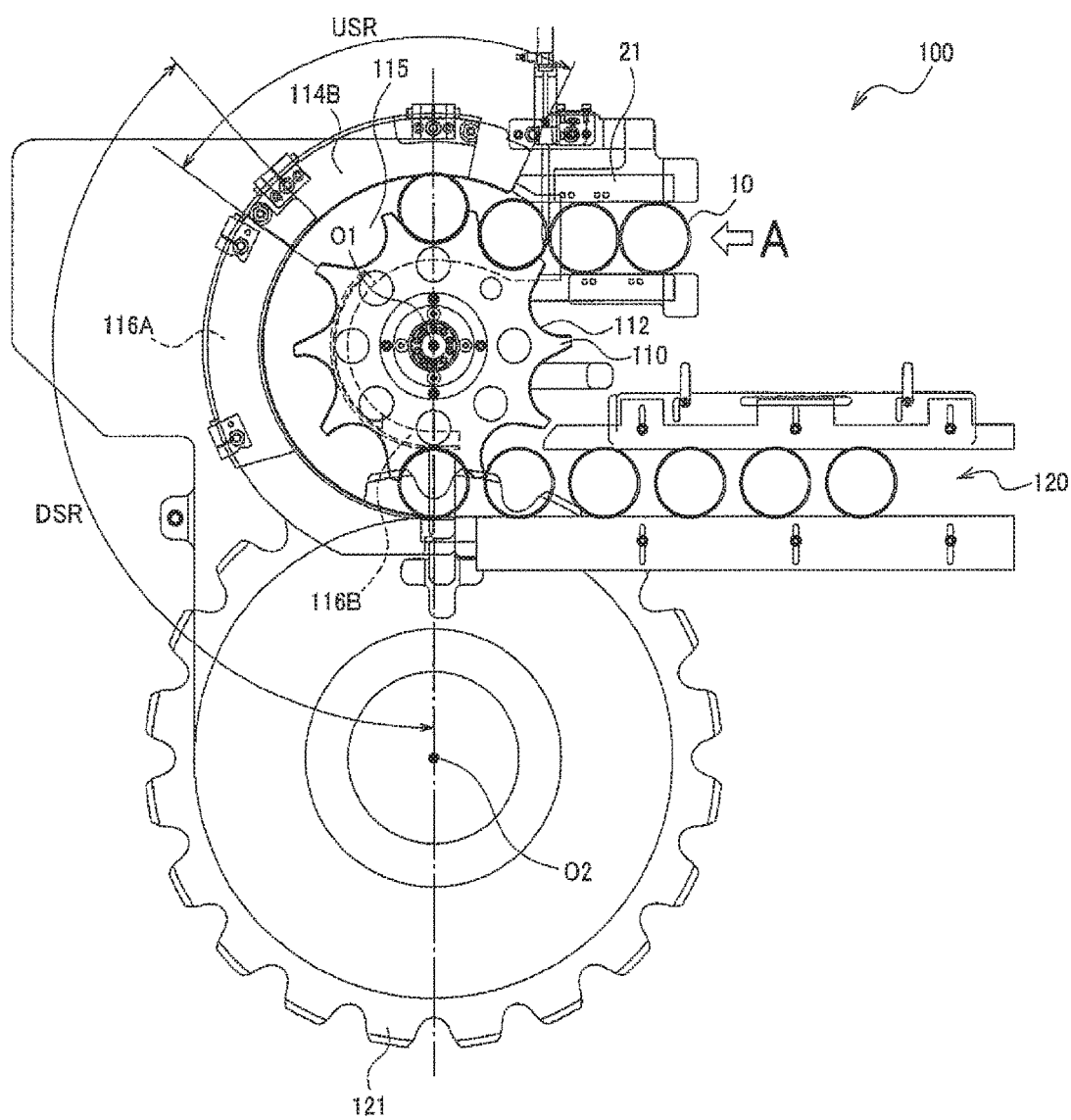
FIG. 3 is an enlarged plan view illustrating a preform handling device.

FIG. 3 is an enlarged plan view illustrating the preform-receiving section (preform handling device) 100 of the blow molding device 1. As illustrated in FIG. 3, the wide-mouth preforms 10 are consecutively supplied to the blow molding device 1 through an outlet 21 of the chute 20. The outlet 21 is a horizontal guideway. Therefore, the center axis 14 of the wide-mouth preforms 10 should be orthogonal to the horizontal plane HR. However, when the wide-mouth preforms 10 are consecutively supplied in line by means of the chute 20, the flanges 13 of the wide-mouth preforms 10 that adjoin overlap each other. In particular, the flanges 13 of the wide-mouth preforms 10 that adjoin almost completely overlap each other when the flange 13 has a small thickness. According to one embodiment of the invention, the wide-mouth preforms 10 are supplied in a stable manner so that supply failure does not occur even in such a case.

As illustrated in FIG. 3, the wide-mouth preforms 10 that are consecutively supplied in line through the outlet 21 of the chute 20 along the direction indicated by the arrow A are separated one by one due to the rotation of a star wheel 110, and transferred to a transfer path such as a heating transfer path 120. The heating transfer path 120 includes a chain 123 (not illustrated in FIG. 3) that is fitted around a first sprocket 121 and a second sprocket 122 (only the first sprocket 121 is illustrated in FIG. 3). As illustrated in FIG. 4, transfer members 130 that support the wide-mouth preform 10 in the inverted state are secured on the chain 123 at a first pitch P1.

Each transfer member 130 includes a holding member 132 that is provided at the upper end of a rotation shaft 131 that is rotatably supported by the chain 123, and inserted into the opening that is formed in the neck 11 of the wide-mouth preform 10 and opens downward, the wide-mouth preform 10 being placed on the holding member 132.

As illustrated in FIGS. 4A and 4B, the upper end of the rotation shaft 131 may be a bolt 131A. In this case, the holding member 132 includes a nut to which the bolt 131A is fastened. Alternatively, a nut hole to which a bolt is fastened may be formed at the upper end of the rotation shaft 131, and the holding member 132 may be coupled to the rotation shaft 131 using the bolt 131A. In this case, the holding member 132 can be exchanged corresponding to the size of the neck 11, and coupled to the rotation shaft 131 when molding the wide-mouth preform 10 that differs in the size of the neck 11.

The transfer member 130 according to one embodiment of the invention has a configuration in which a rotation member such as a disc (friction plate) 133 is secured on the lower end of the rotation shaft 131. A sprocket that is normally used may be used instead of the disc 133 in order to ensure reliable rotation operation.

1.1. Star Wheel and Guide Member

The details of the preform handling device 100 according to one embodiment of the invention are described below with reference to FIGS. 3, 5, 6A, and 6B. The preform handling device 100 includes the star wheel 110, an end face guide member 115 that supports and guides the open end face 11A of the wide-mouth preform 10 in an upstream region USR in which the wide-mouth preform 10 is rotationally transferred by the star wheel 110, and a pair of flange guide members 116A and 116B that are provided in a downstream region DSR on either side of the transfer path along which the wide-mouth preform 10 is transferred, and support and guide the lower side of the flange 13 of the wide-mouth preform 10 in the inverted state.

The star wheel 110 receives the wide-mouth preform 10 that is supplied to each of a plurality of depressions 112 that are formed in the outer circumferential part of the wheel that is rotated, and pushes the part of the wide-mouth preform 10 that is situated above the flange 13 to rotationally transfer the wide-mouth preform 10 from the upstream region USR to the downstream region DSR.

Figure 5:
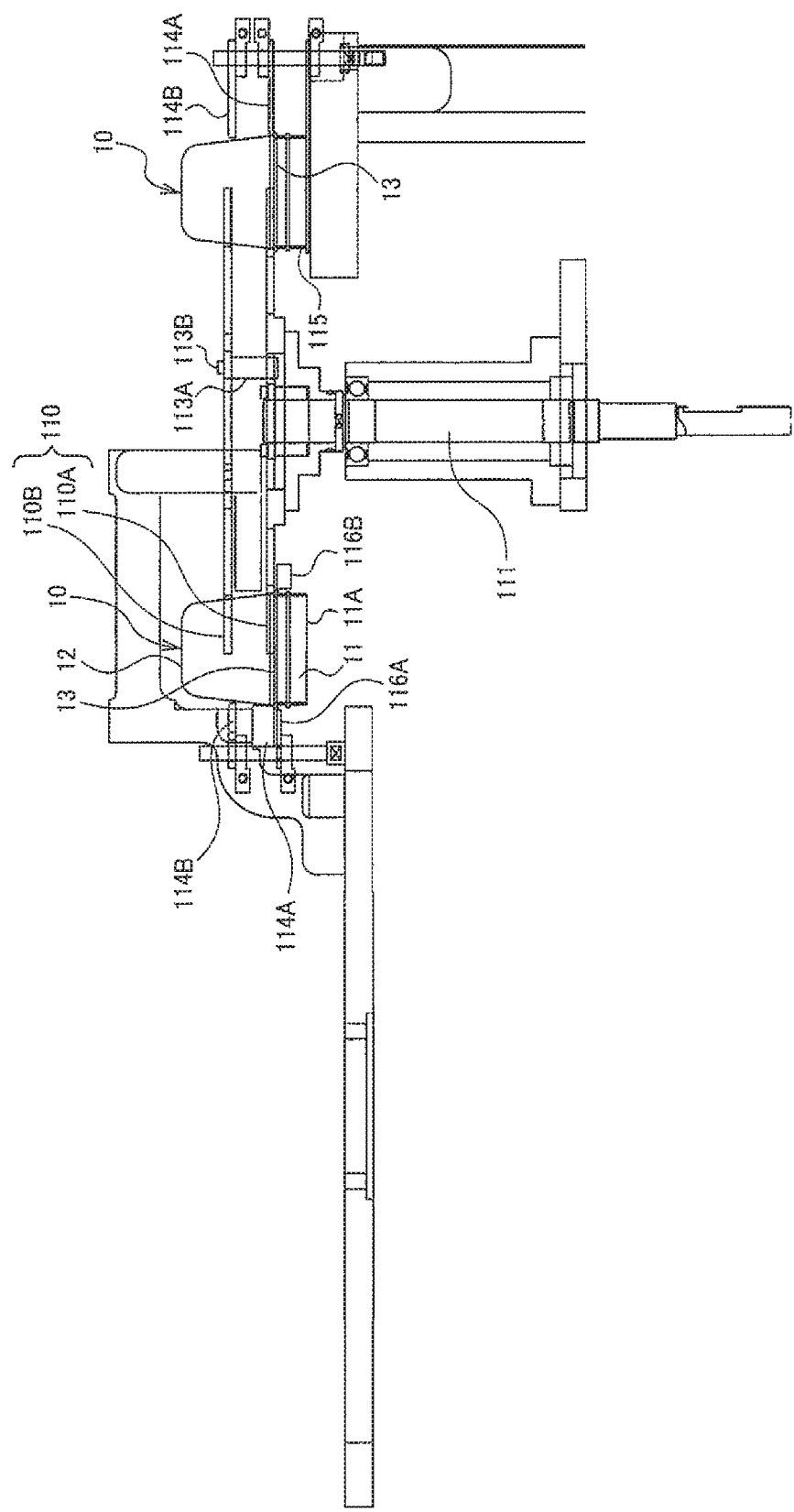
FIG. 5 is a side view illustrating a preform handling device.
Figure 6A:
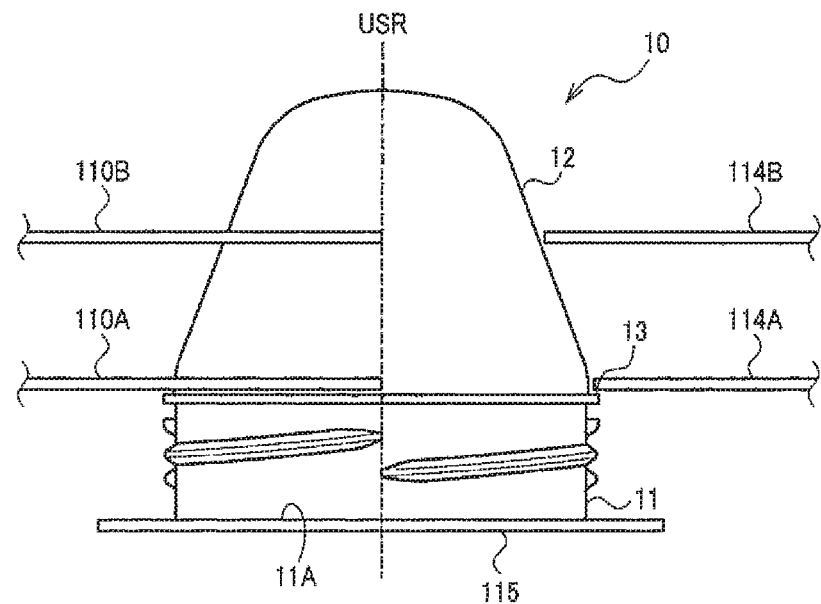
FIG. 6A illustrates the transfer state of a wide-mouth preform in an upstream region of a star wheel.
Figure 6B:
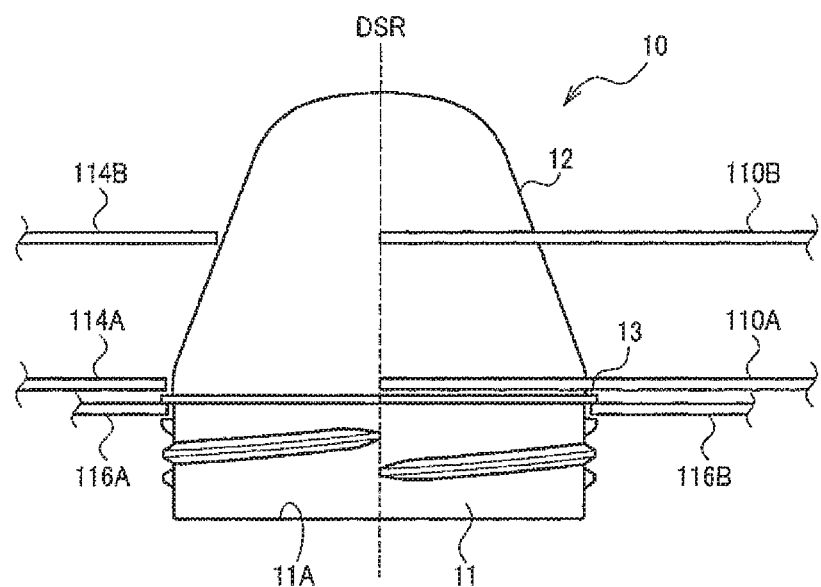
FIG. 6B illustrates the transfer state of a wide-mouth preform in a downstream region of a star wheel.

As illustrated in FIGS. 5, 6A, and 6B, the preform handling device 100 according to one embodiment of the invention includes a lower star wheel 110A and an upper star wheel 110B. The lower star wheel 110A pushes the body 12 of the wide-mouth preform 10 in the inverted state at a position directly above the flange 13 of the wide-mouth preform 10. The upper star wheel 110B pushes the body 12 of the wide-mouth preform 10 in the inverted state at an intermediate position. The lower star wheel 110A is secured on a rotation shaft 111, and the upper star wheel 110B is secured on the lower star wheel 110A through a spacer 113A and a bolt 113B.

A lower body-restricting member 114A and an upper body-restricting member 114B that prevent the movement of the wide-mouth preform 10 outward from the transfer path may be provided on the outer side of the transfer path along which the wide-mouth preform 10 is rotationally transferred by the star wheel 110. Note that the upper star wheel 110B and the upper body-restricting member 114B may be omitted when the body 12 of the wide-mouth preform 10 is short.

In one embodiment of the invention, the upstream region USR and the downstream region DSR illustrated in FIG. 3 overlap each other in a top plan view (i.e., when viewed from above). Specifically, part of the end face guide member 115 that is situated on the downstream side and part of the pair of flange guide members 116A and 116B that is situated on the upstream side overlap each other in a top plan view. Since the end face guide member 115 and the pair of flange guide members 116A and 116B differ in position in the height direction (see FIGS. 6A and 6B), it is possible to allow the downstream-side end of the end face guide member 115 and the upstream-side end of the pair of flange guide members 116A and 116B to overlap each other in a plan view. This makes it possible to smoothly transfer the wide-mouth preform 10 from the end face guide member 115 to the pair of flange guide members 116A and 116B.

1.2. Rotational Transfer Implemented by Star Wheel

The wide-mouth preforms 10 fall along the chute 20 in line due to their weight. In this case, the wide-mouth preforms 10 are consecutively supplied in a state in which the flanges 13 of the wide-mouth preforms 10 that adjoin come in close contact with each other. When the thickness and the protrusion amount of the flange 13 are small (see FIG. 2), the flanges 13 of the wide-mouth preforms 10 that adjoin may be situated one on top of the other. The state in which the flanges 13 are situated one on top of the other is not easily canceled even if vibrations are applied to the wide-mouth preforms 10. Therefore, the front wide-mouth preform 10 of which the flange 13 sits on the flange 13 of the next wide-mouth preform 10 tilts with respect to the guide face of the chute 20 at the outlet 21 illustrated in FIG. 3. Specifically, the wide-mouth preform 10 may be discharged (supplied) from the outlet 21 in a state in which the center axis 14 illustrated in FIG. 2 is tilted with respect to the horizontal plane HR. In such a case, the wide-mouth preform 10 cannot be inserted into a groove or a protruding flange of a known star wheel in a horizontal state (i.e., supply failure occurs).

According to one embodiment of the invention, the depression 112 of the star wheel 110 is not provided with a groove and a protruding flange. The front wide-mouth preform 10 that has entered the depression 112 of the star wheel 110 (110A, 110B) is separated from the next wide-mouth preform 10 due to the continuous rotation of the star wheel 110 (110A, 110B), and is rotationally transferred. The open end face 11A (that is situated at the lower end) of the front wide-mouth preform 10 that has been discharged from the outlet 21 is placed on the end face guide member 115, and the wide-mouth preform 10 is rotationally transferred in a state in which the open end face 11A slides on the end face guide member 115. Therefore, the state in which the flange 13 of the front wide-mouth preform 10 and the flange 13 of the next wide-mouth preform 10 are situated one on top of the other is canceled (i.e., the tilted state of the front wide-mouth preform 10 is canceled), and the front wide-mouth preform 10 is rotationally transferred in a state in which the flange 13 extends horizontally. A situation in which the wide-mouth preform 10 that is rotationally transferred by the star wheel 110 moves outward from the transfer path due to centrifugal force is prevented by the body-restricting members 114A and 114B. The above operation is repeated each time the wide-mouth preform 10 is supplied to the depression 112 in synchronization with the rotation of the star wheel 110. As described above, the wide-mouth preforms 10 that are consecutively supplied while coming in close contact with each other are separated by the star wheel 110 and the end face guide member 115 in the upstream region USR so that the wide-mouth preform 10 in a tilted state is set to a horizontal state, and rotationally transferred along the transfer path.

The lower side of the flange 13 of the wide-mouth preform 10 is supported by the pair of flange guide members 116A and 116B (that are provided on either side of the transfer path) in the downstream region DSR. Since the position of the wide-mouth preform 10 has been corrected so that the flange 13 extends horizontally, the lower side of the flange 13 is reliably supported by the pair of flange guide members 116A and 116B. In particular, when the end face guide member 115 and the pair of flange guide members 116A and 116B overlap each other in a top plan view, the wide-mouth preform 10 can be smoothly transferred from the end face guide member 115 to the pair of flange guide members 116A and 116B.

In one embodiment of the invention, since the lower star wheel 110A pushes the body 12 at a position directly above the flange 13, the star wheel 110A and the flange guide member 116B (that is situated inward with respect to the transfer path) function in the same manner as a known star wheel. Specifically, the protruding flange of the star wheel can be inserted into the small support target part under the flange 13 to support the wide-mouth preform 10 in a horizontal state. Likewise, the body-restricting member 114A and the flange guide member 116A (that is situated outward with respect to the transfer path) function in the same manner as a known star wheel. Since the wide-mouth preform 10 can be transferred in the downstream region DSR without closing the opening of the neck 11, the wide-mouth preform 10 can be transferred from the star wheel 110 to the transfer member 130 by moving the holding member 132 (i.e., part of the transfer member 130) upward to fit the holding member 132 into the neck 11 of the wide-mouth preform 10.

1.3. Transfer from Star Wheel to Transfer Member

Figure 7:
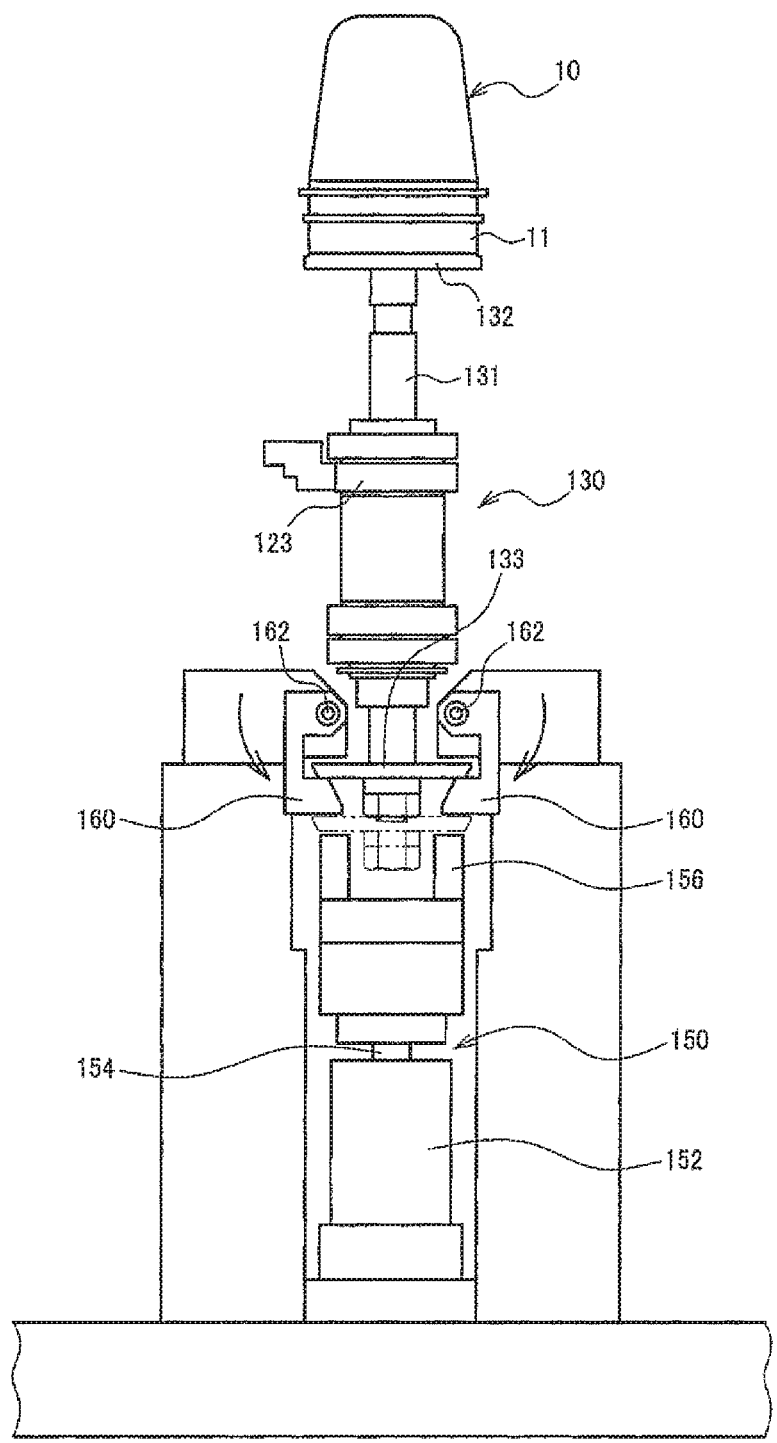
FIG. 7 is a view illustrating a transfer member push-up mechanism.

A structure that transfers the wide-mouth preform 10 that is transferred in the inverted state to the transfer member 130 one by one due to the rotation of the star wheel 110 is described below with reference to FIGS. 3 and 7. In one embodiment of the invention, a transfer member 130 push-up mechanism 150 illustrated in FIG. 7 is provided directly under the transfer path along which the wide-mouth preform 10 is transferred in a downstream area within the downstream region DSR (e.g., an area that intersects a line that connects the center O1 of the star wheel 110 and the center O2 of the first sprocket 121 illustrated in FIG. 3). The push-up mechanism 150 pushes one of a plurality of transfer members 130 (that are transferred by the chain 123) upward to fit part (holding member 132) of the transfer member 130 into the neck 11 of the wide-mouth preform 10 in the inverted state.

As illustrated in FIG. 7, the push-up mechanism 150 includes a push-up section 156 that is secured on a rod 154 that is moved forward and backward by means of an air cylinder 152, for example. The push-up section 156 pushes the disc 133 (that is provided at the lower end of the transfer member 130) upward to move the entire transfer member 130 upward. The disc 133 is pushed upward from the position indicated by the dotted line in FIG. 7 to the position indicated by the solid line in FIG. 7, and the wide-mouth preform 10 is held by the transfer member 130.

The disc 133 that has been pushed upward by the push-up section 156 slides on the push-up section 156 when the transfer member 130 is transferred. A movable contact section 160 may be provided in the heating transfer path 120 at a position that follows the push-up section 156, for example. In this case, the disc 133 that has been pushed upward by the push-up section 156 slides on the push-up section 156 when the transfer member 130 is transferred, and is guided to a stationary contact section 222 (see FIG. 8) through two movable contact sections 160 illustrated in FIG. 7.

Each movable contact section 160 is biased in the arrow direction illustrated in FIG. 7 around a fulcrum 162 due to a biasing member (e.g., spring). If the disc 133 is insufficiently pushed upward by the push-up section 156, the movable contact sections 160 that interfere with the disc 133 rotate around the fulcrum 162 against the biasing force to guide the disc 133 to the correct position.

2. Blow Molding Device

The entire blow molding device 1 is described below with reference to FIG. 1. The blow molding device 1 includes a heating section 200 that includes the heating transfer path 120, an intermittent transfer section 300, and a blow molding section 400. The heating section 200 consecutively transfers the wide-mouth preforms 10 along the endless heating transfer path 120 in the inverted state in which the neck 11 is positioned on the lower side to heat the body 12 of the wide-mouth preform 10. The blow molding section 400 simultaneously blow-molds N (N is an integer equal to or larger than 2 (e.g., N=2)) wide-mouth preforms 10 in an upright state in which the neck 11 is positioned on the upper side to produce containers. The intermittent transfer section 300 intermittently transfers N preforms from the heating section 200 to the blow molding section 400.

When molding a heat-resistant container, the blow molding section 400 may include a primary blow molding section 410 and a secondary blow molding section 420. The primary blow molding section 410 subjects N preforms 10 in the upright state to primary blow molding inside a primary blow mold 411 to form N primary blow-molded articles, and heats the N primary blow-molded articles using the primary blow mold 411 that is heated. The N primary blow-molded articles that have been removed from the primary blow mold 411 and have shrunk are subjected to secondary blow molding inside a secondary blow mold 421 included in the secondary blow molding section 420 in the upright state, and heated using the secondary blow mold 421 that is heated to form N final molded articles (secondary blow-molded articles) that exhibit heat resistance. In one embodiment of the invention, the primary blow mold 411 and the secondary blow mold 421 share a clamping mechanism 430. The blow molding device 1 may further include an ejection section 500 that ejects the N final molded articles in the upright state.

2.1. Heating Section

Figure 8:
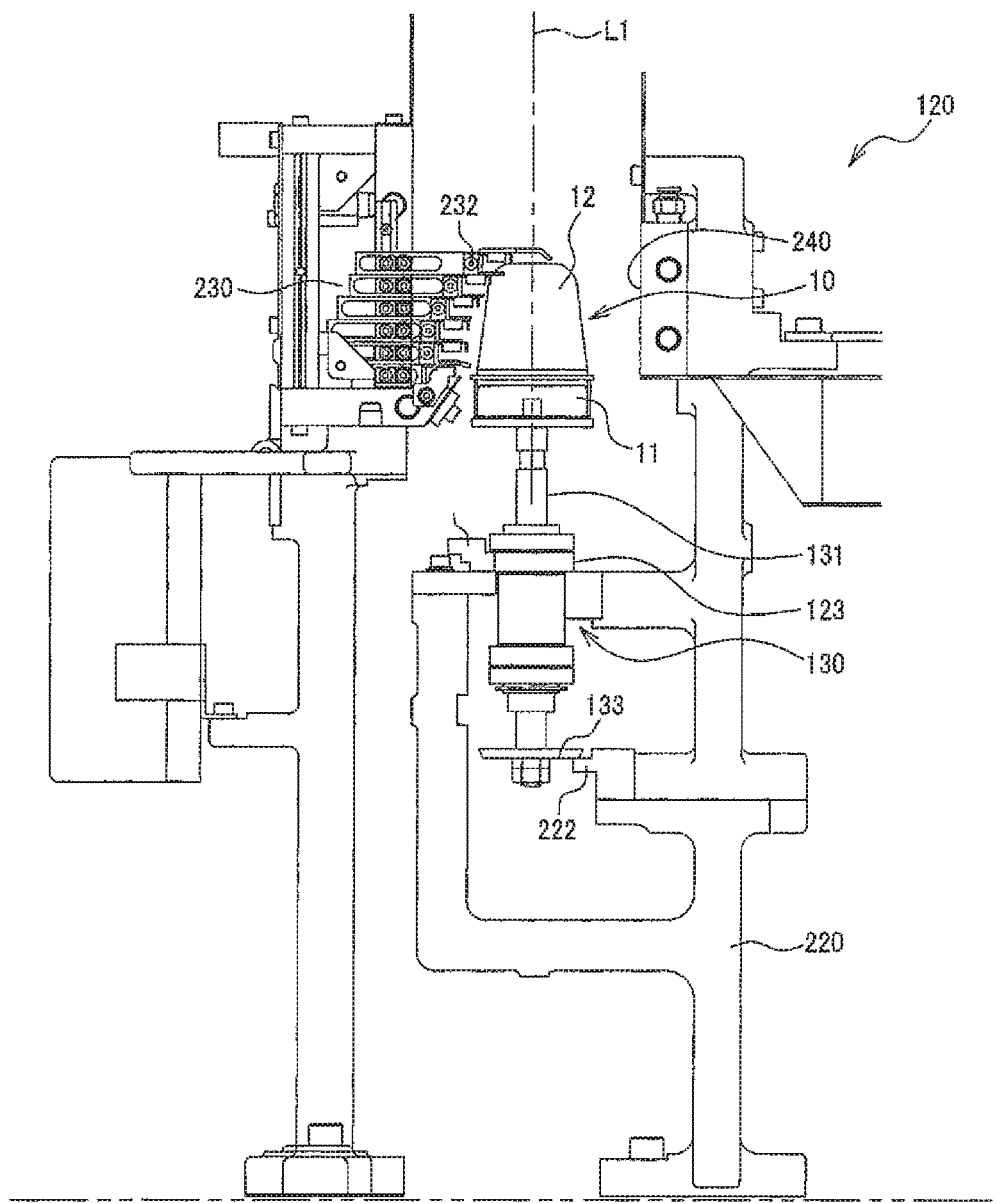
FIG. 8 is a cross-sectional view illustrating a heating section.

The heating transfer path 120 included in the heating section 200 includes an upstream-side first linear transfer path 120A and a downstream-side second linear transfer path 120B (see FIG. 1). A heating mechanism illustrated in FIG. 8 is disposed in the heating transfer path 120 (first linear transfer path 120A and second linear transfer path 120B). As illustrated in FIG. 8, the heating mechanism includes a heater section 230 and a reflection section 240 that are provided on a frame 220, and situated on either side of a centerline L1 of the heating transfer path 120. The heater section 230 includes a plurality of rod-like heaters 232 that heat the body 12 of the wide-mouth preform 10, and differ in position in the height direction. The stationary contact section 222 that comes in contact with the lower side of the disc 133 of the transfer member 130 is formed on the frame 220. When the transfer member 130 that holds the wide-mouth preform 10 is transferred by the chain 123 in the direction perpendicular to the sheet (see FIG. 8), the disc 133 (i.e., friction plate) that is transferred together with the transfer member 130 comes in frictional contact with the stationary contact section 222. A rotational force is thus applied to the disc 133 from the contact section 222, and the rotation shaft 131 (that is rotatably supported by the chain 123) rotates.

Radiant heat rays from the heater section 230 and heat rays generated by the reflection section 240 by reflecting the radiant heat rays are applied to the wide-mouth preform 10 that is rotationally transferred along the heating transfer path 120, and the entire body 12 of the wide-mouth preform 10 is uniformly heated.

2.2. Intermittent Transfer Section

The intermittent transfer section 300 includes N first transfer arms 301, N second transfer arm 302, and N third transfer arms 303 that move along an arm travel path that is provided parallel to the second linear transfer path 120B. The first transfer arm 301 that receives the wide-mouth preform 10 in the inverted state from the heating transfer path 120 is inverted by 180° by an inversion section 310 so that the wide-mouth preform 10 is set to the upright state in which the open end face 11A of the wide-mouth preform 10 faces upward. The drive mechanism that drives the first transfer arm 301 differs from the drive mechanism that drives the second transfer arm 302 and the third transfer arm 303. Each drive mechanism may include a drive pulley that is rotated by a motor, a driven pulley, and a belt that is fitted around the drive pulley and the driven pulley. The first transfer arm 301 is secured on a first belt, and reciprocated between the heating transfer path 120 and the primary blow molding section 410. The second transfer arm 302 and the third transfer arm 303 are secured on a second belt, and respectively reciprocated between the primary blow molding section 410 and the secondary blow molding section 420 and between the secondary blow molding section 420 and the ejection section 500 by the same distance.

The N first transfer arms 301 that receive the wide-mouth preform 10 from the heating section 200 may be fixed at a first pitch P1 (heating pitch=blow molding pitch), or may be subjected to pitch conversion from the first pitch P1 to a second pitch P2 (blow molding pitch) that is larger than the first pitch P1. The pitch of the second transfer arms 302 and the third transfer arms 303 is fixed to the first pitch P1 or the second pitch P2 corresponding to the pitch of the first transfer arms 301. When implementing a molding device that produces a wide-mouth container for which high production volume is not required, it is desirable to employ a fixed pitch method in order to simplify the mechanical configuration and achieve a reduction in cost. For example, two first transfer arms 301, two second transfer arms 302, and two third transfer arms 303 may be provided. The two first transfer arms 301, the two second transfer arm 302, and the two third transfer arms 303 may be used when producing two containers, and one of the two first transfer arms 301, one of the two second transfer arm 302, and one of the two third transfer arms 303 may be used when producing one container. This makes it possible to reduce the number of parts (to be exchanged). The transfer member 130 of the heating section 200 may be provided in a similar way. Specifically, the preforms 10 are provided to each transfer member 130 when producing two wide-mouth containers at the same time, and provided every other transfer member 130 when producing one wide-mouth container. In this case, it is preferable to appropriately change the transfer speed of the transfer member 130 taking account of the size of the preform 10.

2.3. Blow Molding Section

Figure 9:
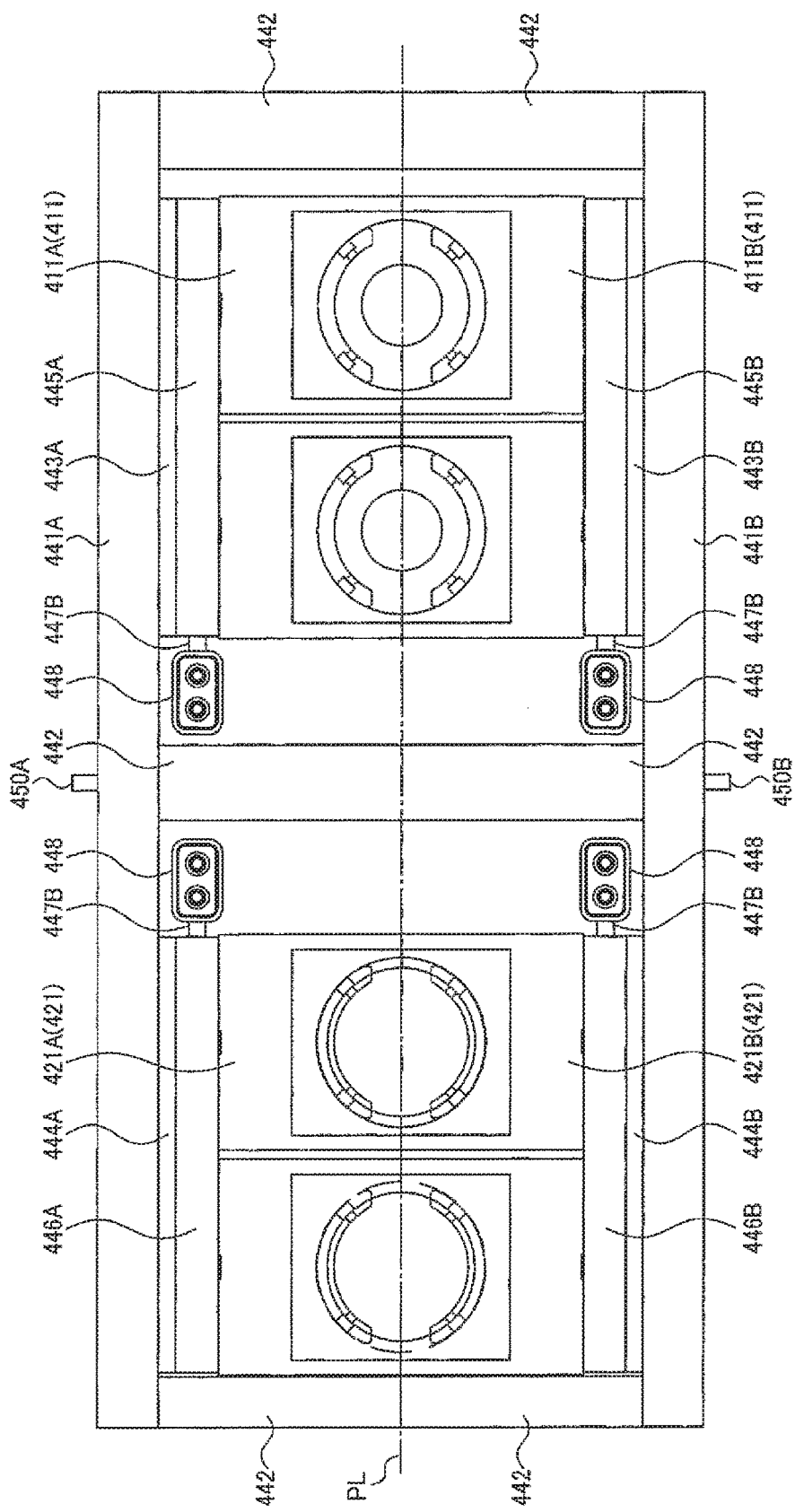
FIG. 9 is a plan view illustrating a blow mold unit that is provided to a pair of clamping plates of a shared clamping mechanism.
Figure 10:
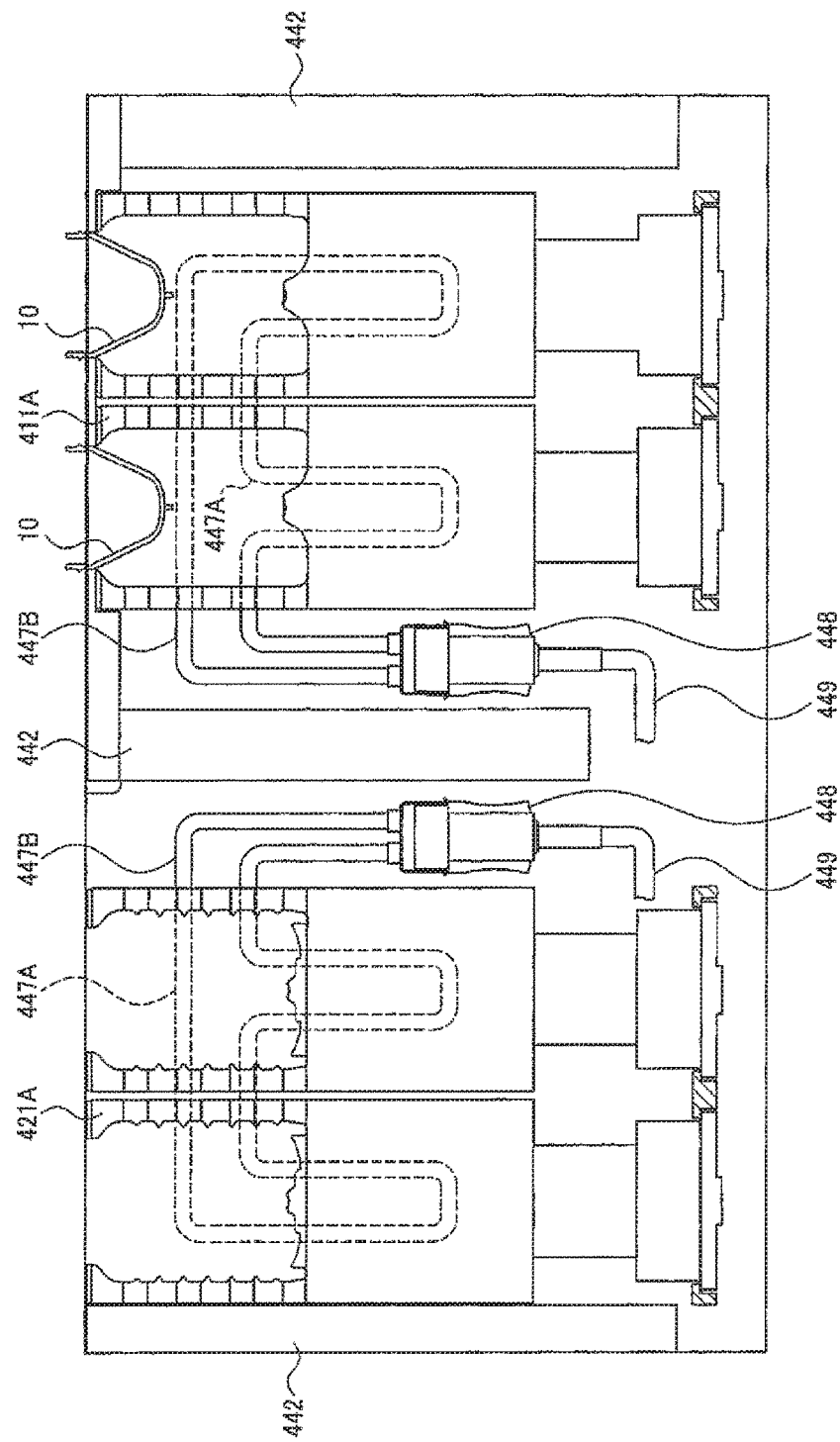
FIG. 10 is a front view illustrating a split mold of a blow mold unit from a parting plane.

The blow molding section 400 includes the primary blow mold 411, the secondary blow mold 421, and the shared clamping mechanism 430. FIGS. 9 and 10 illustrate a blow mold unit 440 that is provided to a first clamping plate and a second clamping plate of the shared clamping mechanism 430. In one embodiment of the invention, the number of wide-mouth preforms subjected to primary blow molding and the number of primary blow-molded articles subjected to secondary blow molding are as small as about 2. Specifically, since the clamping area does not increase to a large extent even when the primary blow mold 411 and the secondary blow mold 421 are handled as a single blow mold that has four cavities in total, the clamping mechanism 430 is shared by the primary blow mold 411 and the secondary blow mold 421.

The blow mold unit 440 includes a first blow base plate 441A and a second blow base plate 441B that are secured on the first clamping plate and the second clamping plate of the shared clamping mechanism 430. Three pressure-receiving plates 442 are secured on each of the first blow base plate 441A and the second blow base plate 441B at positions that correspond to the center and each side in a top plan view.

The primary blow mold 411 is divided along a parting line PL, and includes a first primary blow cavity split mold 411A that is secured on the first blow base plate 441A, and a second primary blow cavity split mold 411B that is secured on the second blow base plate 441B. Likewise, the secondary blow mold 421 is divided along the parting line PL, and includes a first secondary blow cavity split mold 421A that is secured on the first blow base plate 441A, and a second secondary blow cavity split mold 421B that is secured on the second blow base plate 441B.

A first primary heater plate 445A and a second primary heater plate 445B that respectively heat the primary blow cavity split molds 411A and 411B that make a pair are provided along a plane that is opposite to the parting plane (i.e., a plane that extends along the parting line PL) of the primary blow cavity split molds 411A and 411B that make a pair. Likewise, a first secondary heater plate 446A and a second secondary heater plate 446B that respectively heat the secondary blow cavity split molds 421A and 421B that make a pair are provided along a plane that is opposite to the parting plane of the secondary blow cavity split molds 421A and 421B that make a pair.

A first heat insulation plate 443A is provided between the first primary heater plate 445A and the first blow base plate 441A, and a first heat insulation plate 444A is provided between the first secondary heater plate 446A and the first blow base plate 441A. Likewise, a second heat insulation plate 443B is provided between the second primary heater plate 445B and the second blow base plate 441B, and a second heat insulation plate 444B is provided between the second secondary heater plate 446B and the second blow base plate 441B.

According to this configuration, even if the heating temperature of the primary blow mold 411 using the first primary heater plate 445A and the second primary heater plate 445B differs from the heating temperature of the secondary blow mold 421 using the first secondary heater plate 446A and the second secondary heater plate 446B, it is possible to implement insulation using the first heat insulation plates 443A and 444A and the second heat insulation plates 443B and 444B. In one embodiment of the invention, even when the heating temperature using the primary blow mold 411 is set to about 180° C., and the heating temperature using the secondary blow mold 421 is set to 90 to 100° C., the first blow base plate 441A and the second blow base plate 441B can be maintained at room temperature, and it is possible to prevent a situation in which heat exchange occurs between the primary blow mold 411 and the secondary blow mold 421 through the first blow base plate 441A and the second blow base plate 441B.

Each of the primary heater plates 445A and 445B and the secondary heater plates 446A and 446B is formed of cast metal, for example. A cast heater 447A is provided as a built-in heater (see FIG. 10). The primary heater plates 445A and 445B and the secondary heater plates 446A and 446B are configured so that an external connection section 447B that is connected to the cast heater 447A (built-in heater) is exposed to a heat insulation space that is formed between the primary blow mold 411 and the secondary blow mold 421.

The heat insulation space may also be used as a space for providing connectors 448. The connectors 448 are removably provided as a male connector and a female connector. The external connection section 447B is connected to one of the connectors 448, and a lead line 449 is connected to the other of the connectors 448 (see FIG. 10).

As illustrated in FIG. 9, the first blow base plate 441A and the second blow base plate 441B may respectively be provided with positioning pins 450A and 450B that protrude toward the first clamping plate and the second clamping plate (not illustrated in FIG. 9) at the center position in the longitudinal direction.

Since the first blow base plate 441A and the second blow base plate 441B are maintained at about room temperature due to the first heat insulation plates 443A and 444A and the second heat insulation plates 443B and 444B, and thermal expansion becomes a minimum at the center position in the longitudinal direction, the positioning pins 450A and 450B that are provided at the center position in the longitudinal direction have high positional accuracy. Therefore, it is possible to secure the first blow base plate 441A and the second blow base plate 441B on the first clamping plate and the second clamping plate with high positional accuracy by utilizing the positioning pins 450A and 450B. It is more preferable to secure the primary blow mold 411 and the secondary blow mold 421 along the extension of the center of each cavity mold from the outer side of the first blow base plate 441A and the second blow base plate 441B. In this case, since the center position of each cavity mold does not change even if each cavity mold undergoes thermal expansion, it is unnecessary to position a stretching mechanism such as a blow nozzle and a stretching rod.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

For example, the invention may also be applied to a blow molding device that utilizes a preform other than a wide-mouth preform, a blow molding device that molds a container other than a heat-resistant container, a neck crystallization device that crystallizes the neck of a preform, and the like.

The invention claimed is:

1. A preform handling device to which a preform is consecutively supplied in line along a chute, the preform having a flange that protrudes outward at a position away from an open end face of a neck, and being supplied in an inverted state in which the open end face faces downward, the preform handling device comprising:

a star wheel that is configured so that the preform is supplied to each of a plurality of depressions that are formed in an outer circumferential part of a wheel that is rotated, and pushes part of the preform that is situated above the flange to rotationally transfer the preform from an upstream region to a downstream region;

an end face guide member that is provided in the upstream region so as to be situated under the preform that is transferred along a transfer path, the end face guide member supporting and guiding the open end face of the preform that is pushed by the star wheel; and a pair of flange guide members that are provided in the downstream region on either side of the transfer path along which the preform is transferred, the pair of flange guide members supporting and guiding a lower side of the flange of the preform that is pushed by the star wheel, wherein a downstream-side end of the end face guide member and an upstream-side end of the pair of flange guide members overlap each other in a top plan view.

2. A preform handling device to which a preform is consecutively supplied in line along a chute, the preform having a flange that protrudes outward at a position away from an open end face of a neck, and being supplied in an inverted state in which the open end face faces downward, the preform handling device comprising:

a star wheel that is configured so that the preform is supplied to each of a plurality of depressions that are formed in an outer circumferential part of a wheel that is rotated, and pushes part of the preform that is situated above the flange to rotationally transfer the preform from an upstream region to a downstream region;

an end face guide member that is provided in the upstream region so as to be situated under the preform that is transferred along a transfer path, the end face guide member supporting and guiding the open end face of the preform that is pushed by the star wheel; and a pair of flange guide members that are provided in the downstream region on either side of the transfer path along which the preform is transferred, the pair of flange guide members supporting and guiding a lower side of the flange of the preform that is pushed by the star wheel, wherein the star wheel pushes the preform at a position directly above the flange, and the star wheel and one of the pair of flange guide members are situated in the downstream region on either side of the flange through a gap.

3. A preform handling device to which a preform is consecutively supplied in line along a chute, the preform having a flange that protrudes outward at a position away from an open end face of a neck, and being supplied in an inverted state in which the open end face faces downward, the preform handling device comprising:

a star wheel that is configured so that the preform is supplied to each of a plurality of depressions that are formed in an outer circumferential part of a wheel that is rotated, and pushes part of the preform that is situated above the flange to rotationally transfer the preform from an upstream region to a downstream region;

an end face guide member that is provided in the upstream region so as to be situated under the preform that is transferred along a transfer path, the end face guide member supporting and guiding the open end face of the preform that is pushed by the star wheel; and a pair of flange guide members that are provided in the downstream region on either side of the transfer path along which the preform is transferred, the pair of flange guide members supporting and guiding a lower side of the flange of the preform that is pushed by the star wheel, wherein the preform handling device further comprises:
a plurality of transfer members that are secured on a chain that is driven by a sprocket; and
a push-up mechanism that pushes one of the plurality of transfer members upward in the downstream region to fit the one of the plurality of transfer members into the neck of the preform.

4. The preform handling device as defined in claim 2, further comprising:
a body-restricting member that is provided on an outer side of the transfer path along which the preform is transferred, and restricts movement of a body of the preform,
wherein the body-restricting member and the other of the pair of flange guide members are situated in the downstream region on either side of the flange through a gap.

5. A blow molding device comprising:
the preform handling device as defined in claim 3;
a heating section that heats the preform that is transferred by each of the plurality of transfer members; and
a blow molding section that blow-molds the heated preform to produce a container.

* * * * *